(12) United States Patent
Lefaure et al.

(10) Patent No.: US 9,415,642 B2
(45) Date of Patent: Aug. 16, 2016

(54) METHOD OF REPLACING A DETECTION HOUSING PLACED INSIDE THE WHEELS OF A VEHICLE, DEVICE AND SENSOR ALLOWING THE IMPLEMENTATION THEREOF

(75) Inventors: Philippe Lefaure, Montbrun Lauragais (FR); Thierry Moreau, Balma (FR)

(73) Assignee: LDL Technology, Ramonville Saint Agne (FR)

( * ) Notice: Subject to any disclaimer, the term of this patent is extended or adjusted under 35 U.S.C. 154(b) by 250 days.

(21) Appl. No.: 13/510,920

(22) PCT Filed: Nov. 19, 2010

(86) PCT No.: PCT/FR2010/052461
§ 371 (c)(1),
(2), (4) Date: May 18, 2012

(87) PCT Pub. No.: WO2011/061455
PCT Pub. Date: May 26, 2011

(65) Prior Publication Data
US 2013/0061456 A1 Mar. 14, 2013

(30) Foreign Application Priority Data
Nov. 20, 2009 (FR) ..................................... 09 58220

(51) Int. Cl.
*B60C 23/04* (2006.01)
(52) U.S. Cl.
CPC ......... *B60C 23/0408* (2013.01); *B60C 23/0471* (2013.01); *Y10T 29/49007* (2015.01)
(58) Field of Classification Search
CPC ................................................ B60C 23/0408
USPC ................. 340/442, 438, 904, 901; 29/221.5, 29/890.123, 890.124–890.131, 601, 29/402.03, 402.01, 402.08, 600, 595, 593, 29/22
See application file for complete search history.

(56) References Cited

U.S. PATENT DOCUMENTS 4,975,679 A * 12/1990 Ballyns ............... B60C 23/0408
116/34 R
5,055,826 A * 10/1991 Ballyns ............... B60C 23/0408
116/34 R (Continued)

FOREIGN PATENT DOCUMENTS

WO WO 2009/006518 A1 1/2009

OTHER PUBLICATIONS

International Search Report, Mar. 8, 2011, from International Phase of the instant application.

(Continued)

*Primary Examiner* — Peter DungBa Vo
*Assistant Examiner* — Kaying Kue
(74) *Attorney, Agent, or Firm* — Paul and Paul

(57) ABSTRACT

The invention relates to a method of replacing a defective sensor (100) of a surveillance system for monitoring in particular the pressure of the wheels of a vehicle (V) of the type of that comprising: wireless sensors (100) disposed in each wheel and a receiver; a unique identifier number being assigned to each sensor (100) thus making it possible for the receiver to identify the signal. This method is noteworthy in that it consists in: removing the defective sensor (100); identifying and logging the unique identifier number of the defective sensor (100); identifying and logging the communication protocol used on the vehicle; assigning said unique identifier number to a new virgin sensor (200, 200') with neither assigned communication protocol nor assigned identifier number and simultaneously; programming the new sensor (200, 200') so that it utilizes said communication protocol. The invention also relates to the device D and the sensor 200 making it possible to implement same. Applications: detection of data available inside the wheels of a vehicle.

17 Claims, 3 Drawing Sheets

(56) References Cited

U.S. PATENT DOCUMENTS

| | | | | |
|---|---|---|---|---|
| 5,119,066 | A * | 6/1992 | Ballyns | B60C 23/0408 116/34 R |
| 5,600,301 | A * | 2/1997 | Robinson, III | B60C 23/0408 340/442 |
| 6,340,930 | B1 * | 1/2002 | Lin | B60C 23/0416 340/442 |
| 6,453,737 | B2 * | 9/2002 | Young | B60C 23/0416 340/447 |
| 6,507,276 | B1 * | 1/2003 | Young | B60C 23/0464 340/442 |
| 6,604,026 | B2 * | 8/2003 | Schmitt | B60C 23/0408 200/61.22 |
| 6,941,801 | B2 * | 9/2005 | Lemense | B60C 23/0416 340/440 |
| 7,145,443 | B2 * | 12/2006 | Ito | B60C 23/0408 116/34 R |
| 7,358,852 | B2 * | 4/2008 | Nantz | B60C 23/0408 116/34 R |
| 7,675,433 | B2 * | 3/2010 | Hellwig | B60R 16/023 340/442 |
| 8,248,225 | B2 * | 8/2012 | Buck | B60C 23/0493 29/601 |
| 8,289,144 | B2 * | 10/2012 | Zhu | B60C 23/041 340/442 |
| 8,483,908 | B2 * | 7/2013 | Carresjo | B60C 23/0416 701/36 |
| 8,514,063 | B2 * | 8/2013 | Stoehr | 340/438 |
| 8,659,412 | B2 * | 2/2014 | Deniau | B60C 23/0408 340/10.4 |
| 2003/0197603 | A1 * | 10/2003 | Stewart | B60C 23/0444 340/442 |
| 2005/0132792 | A1 | 6/2005 | Lemense et al. | |
| 2005/0262692 | A1 * | 12/2005 | Mondrusov | B23P 19/04 29/890.123 |
| 2006/0208864 | A1 * | 9/2006 | Nantz | B60C 23/0408 340/447 |
| 2008/0133081 | A1 * | 6/2008 | Colarelli | B60C 23/0408 701/29.2 |
| 2009/0024348 | A1 * | 1/2009 | Schuh | G01K 15/00 702/130 |
| 2010/0066524 | A1 | 3/2010 | Yu | |
| 2010/0256874 | A1 * | 10/2010 | Carresjo | B60C 23/0416 701/48 |
| 2010/0274441 | A1 * | 10/2010 | Carresjo | B60C 23/0416 701/31.4 |
| 2010/0274607 | A1 * | 10/2010 | Carresjo | B60C 23/0416 705/7.11 |
| 2011/0001618 | A1 * | 1/2011 | Yabushita | B60C 23/041 340/442 |
| 2011/0210863 | A1 * | 9/2011 | Peters | H04L 67/12 340/870.11 |

OTHER PUBLICATIONS

French Search Report, Jul. 14, 2010, from International Phase of the instant application.

* cited by examiner

METHOD OF REPLACING A DETECTION HOUSING PLACED INSIDE THE WHEELS OF A VEHICLE, DEVICE AND SENSOR ALLOWING THE IMPLEMENTATION THEREOF

FIELD OF THE INVENTION

The present invention relates to the field of the detection of data available inside the wheels of a vehicle and in particular to adaptations for replacing said detection means.

PRIOR ART

A detection system such as a pressure monitoring system consists conventionally of wireless pressure sensors provided with a unique identifying number (ID) placed inside each wheel of the vehicle and a receiver capable of receiving the information from said sensors. The management of this information and in particular the determination of the origin of the information makes the recognition of the unique identifier particularly useful.

The link between the unique identifier and the location thereof is made during a learning phase implemented at the car manufacturer when the vehicle is commissioned. This learning phase consists of causing the receiver and the associated automatic controller/processor to recognize that the signal (and therefore the data) containing a certain identifier corresponds to the data issuing from a certain wheel (and therefore the location of the wheels).

At the present time, when the sensor is out of service, the driver must go to a garage of the make of vehicle, in which the defective sensor is replaced by a new sensor provided with a new unique identifying number. A new learning phase must then be implemented firstly to delete the allocations of data relating to the unique identifying number that will no longer be used because of the removal of the defective sensor, and secondly to create a new link between the new number and the location thereof.

The prior art proposes solutions to these drawbacks, among these the solutions described below.

The document EP 1 562 162 describes a tire monitoring device comprising sensors equipping each tire on a vehicle and detecting the parameters of the tire. The sensors transmit, by a wireless link, the results detected to a monitoring device equipped with a sensor receiving the detected results sent by each sensor in order to monitor the parameters of each tire on the basis of the results detected and received by said receiver. In order to solve the drawbacks of the prior art, said sensor or said monitoring device comprises:
  a storage unit storing more than two types of transmission method information for transferring data between said sensor and said monitoring device, and
  switching means for selecting a type of transmission method information among those stored and for establishing a transmission method on the basis of the information on the transmission method available.

This device enables a replacement sensor according to the invention to dialogue with a monitoring device of the vehicle whatever the make or model of vehicle by making available to the sensor all the communication protocols in a storage unit. The same applies if the monitoring device has all the protocols in order to dialogue with a new sensor.

The document US 2008/0100430 describes a tool for a tire pressure monitoring device, comprising:
  a storage unit configured for storing a plurality of communication protocols used by a tire pressure monitoring device for dialoguing with an electronic control unit of the vehicle,
  a module requesting vehicle data, configured to request vehicle data,
  a module for receiving vehicle data, configured to receive said data,
  an access module configured to access the storage unit for finding at least one communication protocol,
  a determination module configured to determine which communication protocol is stored for a predetermined vehicle, and
  a selection module configured to select the communication protocol based on the vehicle data.

From the protocols stored, the tool can dialogue with the tire pressure monitoring device of the vehicle or with the electronic control unit (sensor) as well as ensuring its updating or the reinstallation of the system.

The document WO 2009006518 describes a method for programming a tire pressure monitoring device, comprising:
  the storage of a plurality of selectable programs for using a pressure monitoring device in a first storage unit,
  activation of one of the selectable programs for using the tire pressure monitoring device according to the defined protocol corresponding to the selected program. This solution requires either an allocation of the identifiers by means of the onboard diagnostic system (OBD) requiring significant hardware investment, that is to say a phase of self-learning by the vehicle onboard computer, a phase requiring a minimum vehicle running time during which the tire pressure monitoring system is not completely functioning.

There also exists the document US 2005132792, which describes a method for replacing a tire on a vehicle of the type equipped with a tire pressure monitoring system. Said vehicle comprises a first sensor which, having a first identification code, is mounted on a first wheel. For the purpose of replacing this first sensor when it fails, the identification number thereof is copied into a replacement sensor.

Such a method does not take account of the plurality of communication protocols liable to be used in this field and therefore requires the establishment of a stock of different types of blank sensors, each type having available the protocol adapted to the make and model of vehicle, etc. Such a method thus has drawbacks of logistics, storage cost and battery service life management.

After analysis of the documents of the prior art, it is clear that the versatility of the various subassemblies is constructed around the use of a storage unit which, equipping the sensors, the monitoring device or the interrogation tool, makes available to the subassemblies the communication protocol for dialoguing with the other subassemblies.

This feature makes it possible, when the monitoring service is commissioned or at the time of a change of subassembly, to guarantee the possibilities of dialogue between the various subassemblies. Nevertheless, it does not solve the drawback relating to the need for learning when a defective sensor is replaced. This is because, even if the sensor or the other subassemblies keep the possibility of dialoguing whatever the model of vehicle or monitoring system, it remains necessary to provide a learning phase.

DESCRIPTION OF THE INVENTION

Starting from this state of affairs, the applicant carried out research aimed at making the replacement of said sensors simpler and quicker.

These researches resulted in the design and implementation of a method of replacing a defective sensor in a monitoring system, in particular for the pressure on the wheels of a vehicle, of the type comprising:
wireless sensors placed in each wheel and a receiver,
a unique identifying number being allocated to each sensor thus enabling the receiver to identify the signal,
remarkable in that it consists of:
removing the defective sensor,
identifying and recording the unique identifying number of the defective sensor,
identifying and recording the communication protocol used on the vehicle,
allocating said unique identifying number to a new blank sensor without a communication protocol or identifying number allocated, and simultaneously
programming the new sensor so that it uses said communication protocol.

This feature is particularly advantageous in that it avoids the learning phase of the system since the initial identifying numbers are kept. It is no longer necessary to carry out a diagnosis of the whole system and it is therefore no longer necessary to have access to the complex programming and learning system available only to garages of the make of vehicle. Thus such a method proposes to record the identifier and the protocol allocated to the sensor to be replaced without passing through the vehicle onboard diagnosis system (OBD).

The versatility proposed by the method of the invention stems from the fact that the sensor is devoid of any identifier or any protocol.

In order to make communication possible once the identifier has been recorded or simultaneously with this recording, the protocol is also recorded.

This identification of the protocol can be carried out by visual identification of the make and model of the vehicle and/or by recording the vehicle identification code (the VIN code).

Naturally, the equipment making possible to allocate a new number to a sensor exists, since this operation is carried out routinely when conventional sensors are manufactured. Nevertheless, in the invention, identifier allocation equipment is used in a novel manner by providing the simultaneous transfer of the identifier and the communication protocol (program loading) of the defective sensor to a new sensor. According to another embodiment the position information is also transferred.

In accordance with the objectives of the invention the replacement of a defective sensor becomes much simpler and less expensive.

It is in fact no longer necessary to manage a stock of different types of blank sensors, each type having the protocol suited to the make and model of the vehicle, etc unlike the solution proposed by the document US 2005132792. In addition, contrary to the solution proposed by the document WO 2009006518, it is no longer necessary to pass through the interface of the onboard diagnosis system (OBD) nor through a self-learning phase by running the vehicle, which constituted both lengthy and expensive solutions. This is because the method of the invention allows total functionality of the tire pressure monitoring system as from the first turn of the vehicle wheel.

In order to facilitate the allocation of the number, the new sensor is a particularly original sensor to which no identifier was allocated during manufacture thereof. This "blank" state does not exist at the end of conventional manufacture and it is therefore a sensor adopting novel features required by the implementation of the method of the invention.

Thus the method of the invention consists of selecting particular operations in a known range and applying them to a novel situation. The known range is that of the installation and commissioning of the monitoring system on the vehicle where sensors are allocated, at the end of the manufacturing chain, a unique identifying number. The situation is no longer commissioning but a maintenance and replacement operation also requiring the functionality of reading and storing the number of the defective sensor.

Said new sensor to which the number of the old sensor will be allocated in place of the latter can be installed in the tire before or after loading of the identifier and protocol, because of the use of tools functioning at a distance by low-frequency waves such as the device described below.

The unique identifying number of the defective sensor is read by a tool of the portable electronic box type using low-frequency radio waves of the type used during maintenance operations.

In order to facilitate future maintenance, the method consists of editing a label comprising said unique identifying number. This is because, whereas some sensors have their identifying number on their body, the same cannot apply for the "blank" sensor able to be used in the method of the invention.

The unique identifying number can in fact also be read by direct visual reading of the operator on the defective sensor when he is carrying it.

The invention also concerns the device for implementing the method as described above and which is remarkable in that it consists of a tool of the portable electronic box type that reads the number of the defective sensor, stores it in memory and transfers it into the memory of a new sensor. The programming of the sensor can be carried out by various methods, including: Bluetooth, V4.0 or Zigbee or transmission by the associated pressure sensor to the microprocessor of the box containing the sensor via a controlled pressure delta, or at 125 kHz low frequency.

According to another feature, it also comprises all the possible protocol programmings and ensures the programming of the sensor according to the communication protocol identified on the vehicle. These protocols can be updated from databases and/or computer servers.

According to another feature, the device is connected by USB technology to a dedicated database and/or server by means of a computer (PC).

According to another particularly advantageous feature, the method consists of storing in memory in a database the maintenance operation performed for traceability.

This connection to a database via a network connected with the associated device or computer is used for purposes of putting the maintenance operation in memory for purposes of nominative traceability by client or vehicle with a mileage monitoring from the last sensor renewal/replacement operation. Such traceability archived in the maintenance operation history enables:
the establishment of a date alert system for reminding the customer of the need to renew the sensors,
the establishment of monitoring related to the make of tire used in order to deduce where they are from and to give driving advice.

This database also makes it possible to monitor in real time the consumption of the replacement market and therefore to know the volume and model of replacement sensors installed in order better to manage and understand the production of said sensors.

After visual identification by the operator of the model of vehicle, the name of the model is entered in the device, the name corresponding to a communication protocol on the basis of which the communication module of said sensor will be configured at the same time as it will be allocated an identifier, which can itself be entered on the device after direct visual reading.

Likewise, entry may be unnecessary if, by low-frequency interrogation, the device can recover all these parameters. Another parameter can consist of the coded information of the location of the sensor. This is because, according to another particularly advantageous feature especially used when the original protocol so demands, the method is remarkable in that information for locating the wheel in which the sensor is placed is allocated in the memory of the sensor at the same time as the unique identifier. The possession of such a device and of a set of blank sensors will enable any mechanic to perform the sensor maintenance operation without requiring a device for dialog with the onboard diagnosis system (OBD).

Once the new sensor has been installed, the programming and configuration of it are checked by said device, which carries out a remote interrogation and forces said sensor to transmit.

According to another feature, it is before installation that the programming and configuration of it are checked by said device, which performs a remote interrogation and forces said sensor to transmit. Thus the method is remarkable in that it consists of interrogating the new sensor after programming, said sensor responding for validation of the state thereof. This interrogation is then done on the basis of external data.

The fundamental concepts of the invention having just been disclosed above in the most elementary form thereof, other details and features will emerge more clearly from a reading of the following description with regard to the accompanying drawings, giving by way of non-limitative example two embodiments of a device and sensor according to the invention.

DESCRIPTION OF EMBODIMENTS

Figure 1:
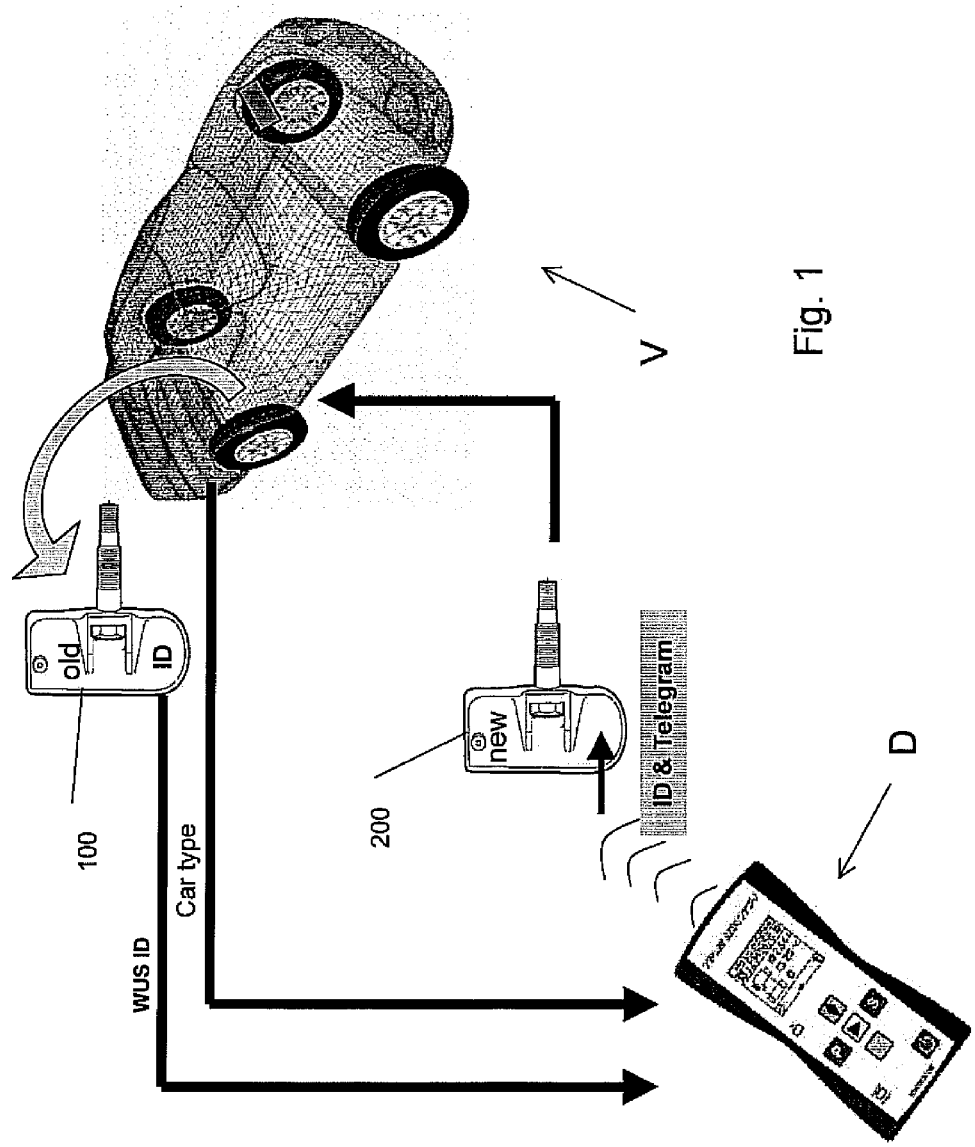
FIG. 1 is a diagram illustrating a first embodiment of a device for implementing a method according to the invention.

As illustrated in the drawing in FIG. 1, the method of the invention is implemented by the device D illustrated, which consists of a tool of the low-frequency portable electronic box type that reads the identifying number of the defective sensor 100 of a wheel of the vehicle V, stores it in memory and transfers it into the memory of a new sensor 200.

The portable electronic box D can interrogate the defective sensor by low-frequency transmission or (in particular in the case where the defective sensor is no longer interrogatable) the operator can read the identifying number on the casing of the sensor 100. Another operation performed by the operator concerns the recognition of the vehicle, which makes it possible to determine the communication protocol that it is using.

Thus, when the device D communicates by low frequency to the sensor 200 which, in accordance with the invention, is devoid of any identifying number or protocol, the old identifying number and the protocol used are loaded into said sensor. To do this, the sensor 200 is remarkable in that it has an empty or rewritable identifier storage memory.

According to another feature, one item of information relates to the location of the wheel in which the defective sensor 100 was positioned and in which the new sensor 200 will be positioned.

Figure 2:
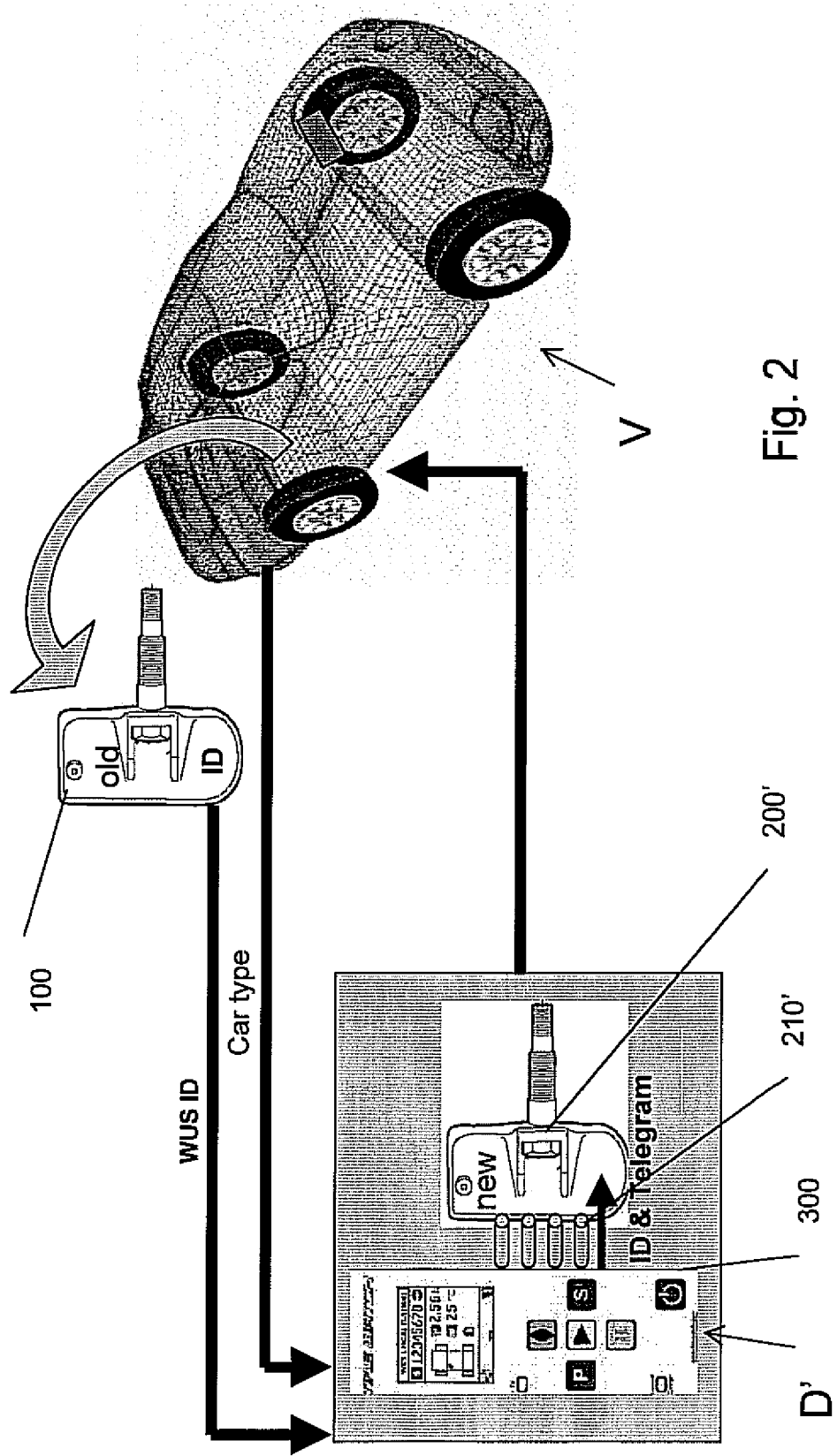
FIG. 2 is diagram illustrating a second embodiment of a device for implementing a method according to the invention.

The method illustrated by the drawing in FIG. 2 differs from the first in that the device D' for implementing it consists of a tool of the electronic box type equipped with a sensor accommodation and communication plate 300 for purposes of reading information and/or transmitting information by contact in order to read the number of the defective sensor 100, store it in memory and transfer it into the memory of a new sensor 200'. The transmission is made by dry contacts without the use of radio frequency. Such a feature enables the device D' to supply the defective sensor in order to enable the information that it contains to be read. To do this, the sensor 200' is equipped with an interface 210' connected to the subassemblies accommodated by the housing of the sensor 200' and with which the accommodation plate 300 of the electronic box D' cooperates.

Whether by radio frequency or by direct contact, the tool of the portable electronic box type D or D' configures the blank sensor so that it adopts the communication protocol used by the defective sensor.

Figure 3:
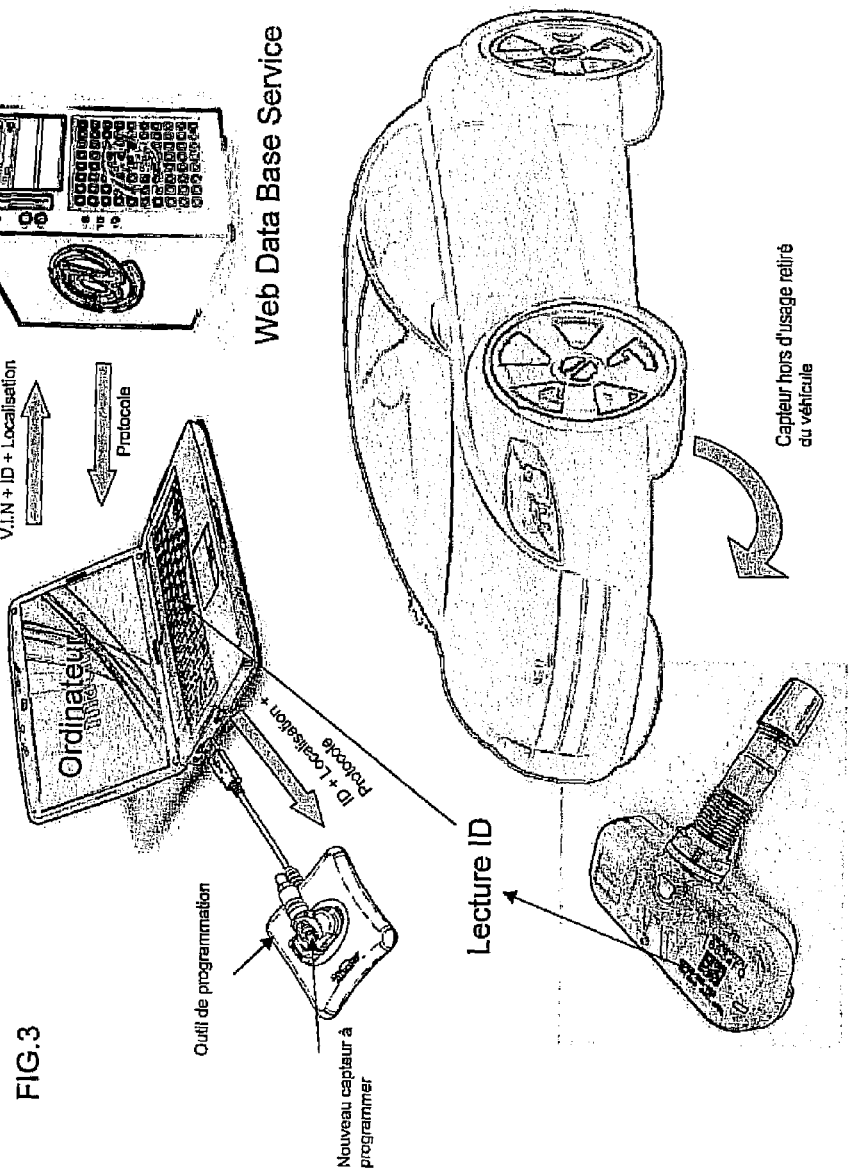
FIG. 3 is a diagram illustrating a third embodiment of a device for implementing a method according to the invention.

An example of the succession of operations is illustrated by FIG. 3. On the basis of the embodiment illustrated by this figure, the various steps of the method of the invention follow each other in the following fashion:

step 1
the identification number of the vehicle is recorded and, failing this, the make, model and year,
step 2
the identifier of the sensor to be replaced is read, and the position thereof (front left, front right, etc) is also noted,
step 3
a sensor entirely devoid of any protocol, with a blank memory for receiving an identifier, is placed on a programming device,
step 4
the programming device is connected by a technology of the USB type to a database, a dedicated server, by means of a computer (PC),
step 5
the recorded data (VIN, location, identifier) are entered, and the database associated with the executable resident in the PC will launch, by means of the programming module, the programming of the sensor by various methods, including: Bluetooth V4.0 or Zigbee or transmission by the associated pressure sensor to the microprocessor of the box containing the sensor via a controlled pressure delta, or also in 125 kHz low frequency. During this programming the correct single protocol and the identifier read on the sensor to be replaced are injected into the new sensor.
step 6
the sensor responds in radio frequency (315 MHz; 434 MHz, 868 MHz, or even Zigbee or Bluetooth V4.0) and validates all the transmission and correct learning thereof. This validation constitutes a final test triggering installation and avoiding dismantling in the event of damage.
step 7
the technician installs the replacement sensor in place of the old one.

It will be understood that the method, device and sensor that have just been described above and depicted were described and depicted with a view to disclosure rather than a limitation. Naturally various arrangements, modifications and improvements can be made to the above example without for all that departing from the scope of the invention.

The invention claimed is:

1. A method of replacing a first sensor in a monitoring system, for the pressure on the wheels of a vehicle, the first sensor being defective, the monitoring system including wireless sensors placed in each wheel and a receiver, wherein a unique identifying code is assigned to each sensor thus enabling the receiver to identify a signal, the monitoring system being configured to communicate according to a selected one of a plurality of communications protocols, the method comprising the following steps:

removing the first sensor;

identifying and recording the unique identifying code of the first sensor;

recognizing the vehicle;

identifying, responsive to the recognizing step, the communication protocol used on the vehicle;

responsive to the second identifying step, transferring a first data item to a second sensor, the first data item including programming for one of the plurality of communication protocols;

subsequent to the identifying steps, transferring a second data item, in addition to the first data item, to the second sensor, the second data item including the unique identifying code of the first sensor;

subsequent to the identifying steps, transferring a third data item, in addition to the first data item and the second data item, to the second sensor, the third data item including information for locating the wheel in which the second sensor is placed, thereby enabling a person to perform a sensor maintenance operation without requiring dialog with a diagnosis system onboard the vehicle, wherein the step of recognizing the vehicle includes visual identification of a make and model of the vehicle.

2. A method according to claim 1, characterized in that the unique identifying code of the defective sensor is read by a portable tool.

3. A method according to claim 1, characterized in that the method further comprises editing a label comprising the unique identifying code.

4. A method according to claim 1, characterized in that the unique identifying code of the defective sensor is read visually on the defective sensor.

5. A method according to claim 1, characterized in that the method further comprises storing in memory in a database the maintenance operation performed for traceability.

6. A method according to claim 1, characterized in that the method further comprises interrogating the new sensor after programming, the sensor responding for validation of the state thereof.

7. A method according to claim 1 wherein transferring the first data item includes transferring programming for the communication protocol identified in the second identifying step.

8. A method according to claim 1 wherein the first and second transferring steps are simultaneously performed.

9. A method of replacing a first sensor in a monitoring system, for the pressure on the wheels of a vehicle, the first sensor being defective, the monitoring system including wireless sensors placed in each wheel and a receiver, wherein a unique identifying code is assigned to each sensor thus enabling the receiver to identify a signal, the monitoring system being configured to communicate according to a selected one of a plurality of communications protocols, the method comprising the following steps:

removing the first sensor;

identifying and recording the unique identifying code of the first sensor;

recognizing the vehicle;

identifying, responsive to the recognizing step, the communication protocol used on the vehicle;

responsive to the second identifying step, transferring a first data item to a second sensor, the first data item including programming for one of the plurality of communication protocols;

subsequent to the identifying steps, transferring a second data item, in addition to the first data item, to the second sensor, the second data item including the unique identifying code of the first sensor;

subsequent to the identifying steps, transferring a third data item, in addition to the first data item and the second data item, to the second sensor, the third data item including information for locating the wheel in which the second sensor is placed, thereby enabling a person to perform a sensor maintenance operation without requiring dialog with a diagnosis system onboard the vehicle, wherein the step of recognizing the vehicle includes recording a vehicle identification code.

10. A method of replacing a first sensor in a monitoring system, for the pressure on the wheels of a vehicle, the first sensor being defective, the monitoring system including wireless sensors placed in each wheel and a receiver, wherein a unique identifying code is assigned to each sensor thus enabling the receiver to identify a signal, the monitoring system being configured to communicate according to a selected one of a plurality of communications protocols, the method comprising the following steps:

removing the first sensor;

identifying and recording the unique identifying code of the first sensor;

recognizing the vehicle;

identifying, responsive to the recognizing step, the communication protocol used on the vehicle;

responsive to the second identifying step, transferring a first data item to a second sensor, the first data item including programming for one of the plurality of communication protocols;

subsequent to the identifying steps, transferring a second data item, in addition to the first data item, to the second sensor, the second data item including the unique identifying code of the first sensor;

subsequent to the identifying steps, transferring a third data item, in addition to the first data item and the second data item, to the second sensor, the third data item including information for locating the wheel in which the second sensor is placed, thereby enabling a person to perform a sensor maintenance operation without requiring dialog with a diagnosis system onboard the vehicle, wherein the step of recognizing the vehicle includes visual identification of a make and model of the vehicle, or recording a vehicle identification code.

11. A method according to claim 10, characterized in that the unique identifying code of the defective sensor is read by a portable tool.

12. A method according to claim 10, characterized in that the method further comprises editing a label comprising the unique identifying code.

13. A method according to claim 10, characterized in that the unique identifying code of the defective sensor is read visually on the defective sensor.

14. A method according to claim 10, characterized in that the method further comprises storing in memory in a database the maintenance operation performed for traceability.

15. A method according to claim 10, characterized in that the method further comprises interrogating the new sensor after programming, the sensor responding for validation of the state thereof.

16. A method according to claim 10 wherein transferring the first data item includes transferring programming for the communication protocol identified in the second identifying step.

17. A method according to claim 10 wherein the first and second transferring steps are simultaneously performed.

* * * * *